(12) United States Patent
Kim et al.

(10) Patent No.: US 6,541,877 B2
(45) Date of Patent: Apr. 1, 2003

(54) WIND POWER GENERATION SYSTEM

(75) Inventors: Houng Joong Kim, Hitachi (JP); Shigeta Ueda, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/951,966

(22) Filed: Sep. 14, 2001

(65) Prior Publication Data

US 2002/0117861 A1 Aug. 29, 2002

(30) Foreign Application Priority Data

Feb. 28, 2001 (JP) ........................................ 2001-053426

(51) Int. Cl.[7] ................................................. H02P 9/00
(52) U.S. Cl. .......................................... 290/44; 290/55
(58) Field of Search ........................ 290/44, 55; 322/17, 322/19, 28

(56) References Cited

U.S. PATENT DOCUMENTS

| 3,713,015 | A |   | 1/1973  | Frister ........................... 322/28 |
| 5,083,039 | A | * | 1/1992  | Richardson et al. ........... 290/44 |
| 5,140,170 | A | * | 8/1992  | Henderson ..................... 290/44 |
| 5,821,710 | A |   | 10/1998 | Masuzawa et al. .......... 318/254 |
| 6,420,795 | B1 | * | 7/2002 | Mikhail et al. ................ 290/44 |
| 2002/0053802 | A1 | * | 5/2002 | Makino et al. ................ 290/44 |
| 2002/0087234 | A1 | * | 7/2002 | Lof et al. ..................... 700/286 |
| 2002/0105189 | A1 | * | 8/2002 | Mikhail et al. ................ 290/44 |

FOREIGN PATENT DOCUMENTS

| EP | 0864748 | 9/1998 |
| FR | 2191329 | 7/1973 |

* cited by examiner

Primary Examiner—Nicholas Ponomarenko
(74) Attorney, Agent, or Firm—Crowell & Moring LLP (57) ABSTRACT

The object of the present invention is to provide a wind power generation system characterized by simplified field weakening of the magnetic flux of the permanent magnet of a shaft generator and a speed change control over an extensive range.

In a wind power generation system comprising a main shaft where a vane is mounted, a generator connected to the main shaft for transmitting the rotating power of the vane, an inverter for converting the electric power of the generator, a controller for controlling the inverter, a means for controlling the pitch of the vane meeting the wind velocity requirements, a brake, and an anemometer/anemoscope; the present invention is characterized in that the rotor of the rotary machine comprising a permanent magnet is split to allow relative movement.

14 Claims, 13 Drawing Sheets

WIND POWER GENERATION SYSTEM

BACKGROUND OF THE INVENTION

1. Field of the Invention

The present invention relates to a generator using a permanent magnet for the field, particularly to a generator of the wind power generation system and the control method thereof. More particularly, it relates to a generator and control method thereof where the generator rotor comprises a first and second field magnets, and the magnetic pole centers of the first and second field magnets are changed in conformity to the direction of torque, and effective amount of magnetic flux is variable in conformity to speed.

2. Description of the Prior Art

In the permanent magnet field type generator according to the prior art, inductive electromotive force E is determined by a certain magnetic flux Φ produced by the permanent magnet mounted on the rotor and the rotating angular speed ω of the generator. In other words, the inductive electromotive force of the generator rises in proportion to the increase in the rotating angular speed ω (speed) of the generator.

Thus, a high torque can be obtained in the low speed range, but operation in the high speed range is difficult due to limited variable range of the speed. To solve this problem, it is possible to consider expansion of the high speed operation range by field weakening control art.

Furthermore, to ensure a specified output in a wide speed range, the generator of wind power generation system is provided with a gear mechanism and pitch motor in order to meet a great variety of wind velocity conditions. In some prior arts, various phase windings of the generator are switched between low-speed winding and high-speed winding according to the main shaft speed, using a winding switching apparatus.

SUMMARY OF THE INVENTION

Expansion of the high-speed operation range by the field weakening control art referred in the description of the prior art is restricted by heat generation by weakening field current or reduction of efficiency.

When a winding switching apparatus is used to switch the winding of each phase according to the main shaft speed, the following problems arise: The number of lead wires from the generator is too many, and winding switching controller and its structure are complicated.

Complicated structure results in an increase in the weight of the nacelle of the wind power generation system, and requires the tower structure to be reinforced.

A wind power generation system comprising;
- a main shaft where a vane is mounted,
- a generator connected to the main shaft for transmitting the rotating power of the vane,
- an inverter for converting the electric power of the generator,
- a controller for controlling the inverter,
- a means for controlling the pitch of the vane meeting the wind velocity requirements,
- a brake, and
- an anemometer/anemoscope;
- the wind power generation system using the generator further characterized in that,
  - the generator further comprises a stator having a primary winding and a rotor having a field magnet;
  - the field magnet further comprises, a first field magnet having magnetic poles with different polarities arranged sequentially in the direction of rotation; and
  - a secondary field magnet having magnetic poles with different polarities arranged sequentially in the direction of rotation;
  - this second field magnet being capable of relative rotation with respect to the first field magnet;
  - the first and second field magnets are placed opposite to the stator magnetic pole;
  - a mechanism for changing the composite phase of the magnetic poles of the first and second field magnets with respect to magnetic pole of the first field magnet in conformity to the direction of the rotor torque; and
  - the mechanism of changing in conformity to the direction of the rotor torque has;
    - a means for aligning the same magnetic pole centers of the first and second field magnets in conformity to the direction of torque occurring to the rotor and the balance of magnetic action between the first and second field magnets, and
    - a means for displacing the magnetic pole centers of the first and second field magnets as the direction of torque occurring to the rotor is reversed.

The permanent magnet type synchronous generator of the present invention has the effect of changing the amount of effective magnetic flux due to a permanent magnet opposite to the stator magnetic pole, because of the following arrangement: A rotor split into the first field and second magnets is installed on one and the same shaft so that the magnetic pole centers of the first and second field magnets can be changed according to the direct of torque.

In particular, it has an effect in providing simple field weakening of the main shaft generator of the wind power generation system, and in allowing speed change control over an extensive range. A simplified structure of the generator reduces the generator weight, with the effect that tower structure can be simplified.

DESCRIPTION OF THE PREFERRED EMBODIMENTS

The following describes the embodiments of the present invention.

Figure 1:
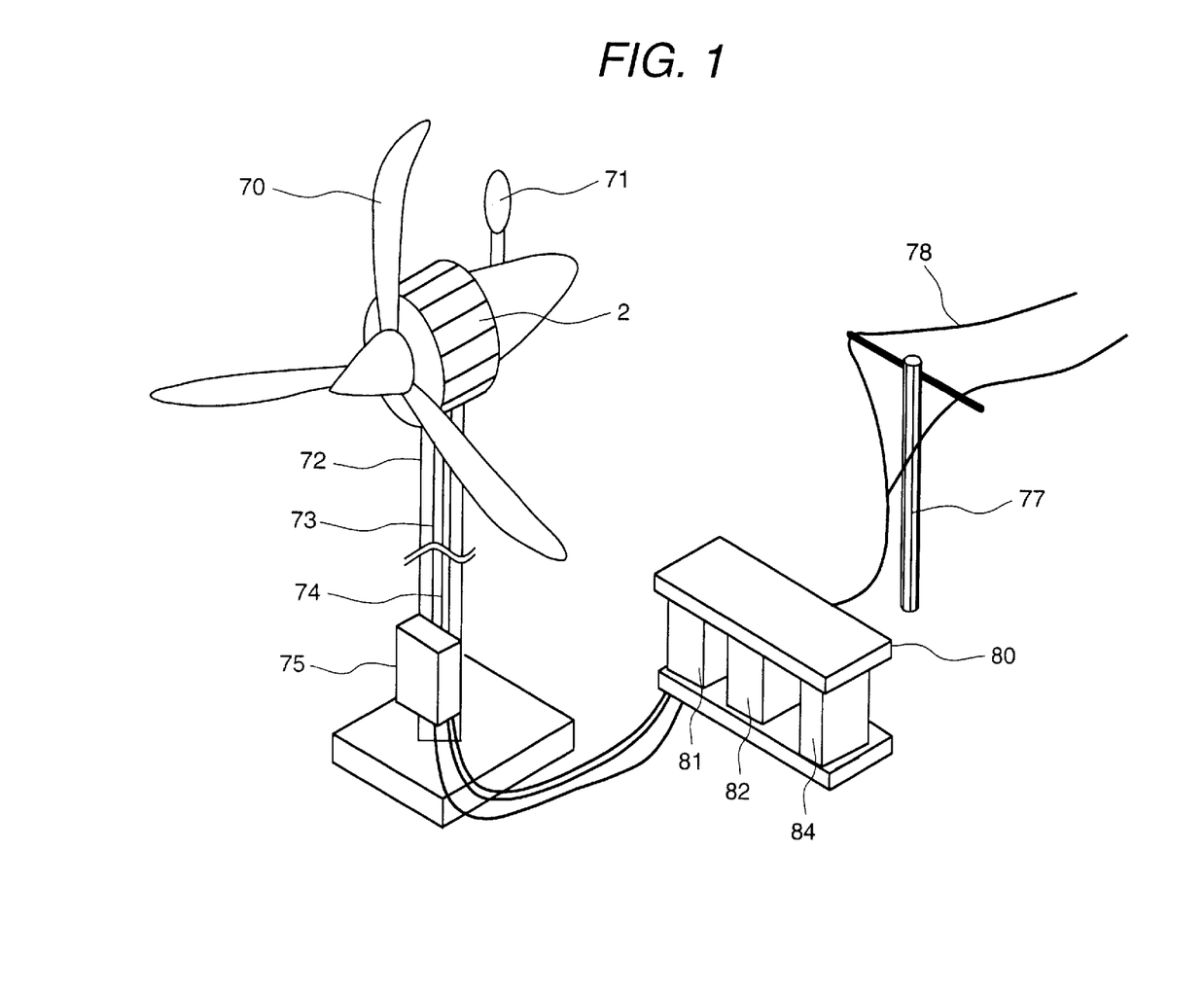
FIG. 1 is a drawing representing the general view of a wind power generation system provided with a permanent magnet type synchronous generator according to the present embodiment.

FIG. 1 is a drawing representing the general view of a wind power generation system provided with a permanent magnet type synchronous generator according to the present embodiment.

In FIG. 1, a vane 70, generator 2, wind velocity anemoscope 71 are installed on the top of the tower 72. The generator is connected to a sub-station house 80 through a control cable 73 and power cable 74, and electric power is sent to a power transmission line 78.

A control panel 75 is installed between the sub-station house 80 and a tower 72 provided with generator 2, and contains built-in switches, cables and intermediate connection terminals.

Furthermore, the sub-station house 80 is equipped with a transformer 81, inverter 82 and controller 84 for controlling this inverter, whereby electric power generated from the wind power generator is sent to the system. The inverter 82 has also a function for taking appropriate measures against voltage and output fluctuations.

Figure 2:
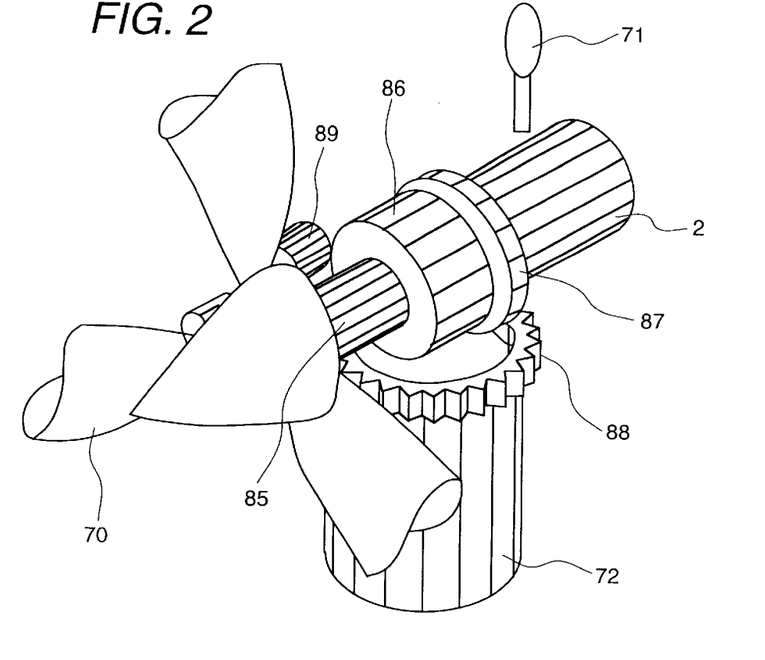
FIG. 2 is a schematic diagram showing the top of the wind power generation system tower in FIG. 1.

FIG. 2 is a schematic diagram showing the constituting elements of the top of the tower 72.

In FIG. 2, each vane 70 is mounted on the main shaft 85, and the main shaft and generator 2 are connected with each other.

Further, multiple pitch motors 89 in numbers in conformity to the number of vanes are installed as a means for controlling the pitch of the vane 70. A yaw gear 88 is installed to turn the top of the tower in conformity to the direction of the wind detected from the wind velocity anemoscope 71. A brake 87 is mounted between the main shaft 85 and generator 2. When an emergency has occurred or when the wind velocity detected by the aforementioned wind velocity anemoscope 71 has exceeded a certain velocity, the vane 70 is controlled to face at a right angle to wind, thereby suspending rotation. Moreover, there is a product type where a step-up gear 86 is installed between the main shaft and generator to increase the speed of the generator, thereby downsizing the generator. There is also a direct type product which is not provided with the aforementioned step-up gear 86 (gearless). The gearless direct method eliminates noise and ensures easy maintenance. Needless to say, the generator 2 according to the present invention is applicable to both of these product types.

Figure 3:
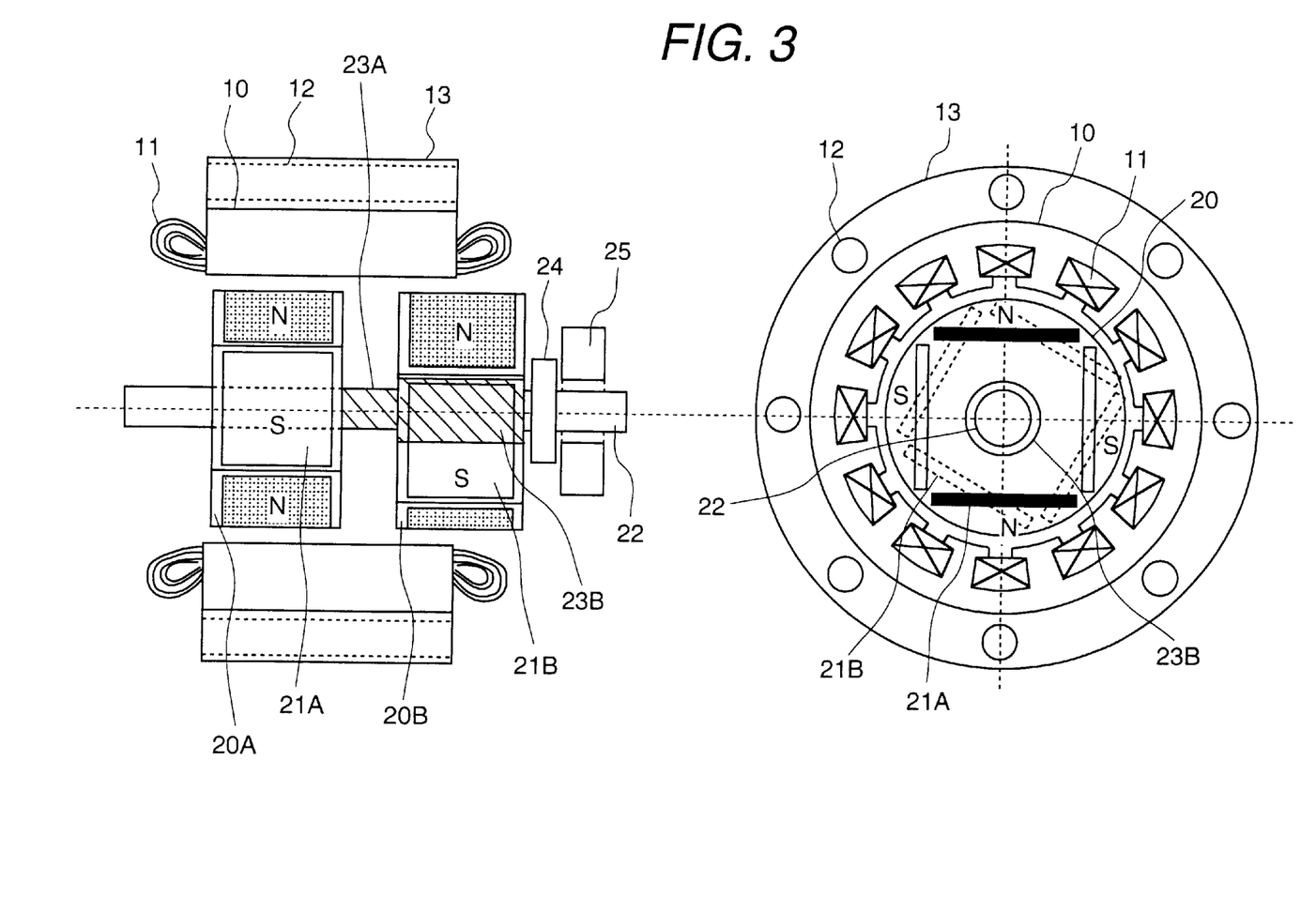
FIG. 3 is a schematic diagram wherein the same magnetic pole centers of the rotors of the generator FIG. 1 are displaced (1)

FIG. 3 is a schematic diagram wherein the same magnetic pole centers of the rotors of the generator FIG. 1 are displaced.

In FIG. 3, a stator core 10 has an armature winding 11 wound inside the slot, and is connected to a housing 13 incorporating a cooling channel 12 where refrigerant flows.

The permanent magnet embedded type rotor 20 consists of a first rotor 20A fixed to the shaft 22 and a second rotor 20B separated from the shaft 22. Needless to say, either a permanent magnet embedded type rotor or a surface magnet type rotor can be used.

On the first rotor 20A, a permanent magnet 21A has magnetic poles with different polarities arranged sequentially in the direction of rotation. Similarly, on the second rotor 20B, permanent magnet 21B has magnetic poles with different polarities arranged sequentially in the direction of rotation. The field magnet where two rotors (the first and second rotors) are arranged in the same shaft is placed opposite to the stator magnetic pole.

The inner diameter side of the second rotor 20B is internally threaded to serve as a nut 23B, and the shaft in contact therewith is threaded to serve as a bolt 23A so that they are connected with each other by this thread function. The second rotor 20B can be moved in the axial direction while rotating on the shaft.

To ensure that the second rotor 20B will not be displaced from the center of the stator in excess of the specified displacement, a stopper 24 is provided away from the side of the aforementioned second rotor 20B. Further, a stopper drive actuator 25 is installed as a servo mechanism so that aforementioned stopper 24 can be moved in the lateral direction in parallel with the shaft. This makes it possible to change the displacement value of the magnetic pole centers of the first and second field magnets. As a result, armature winding 11 can control the amount of effective magnetic flux in the entire unit consisting of the first and second field magnets with respect to the stator wound inside the slot.

The amount of the effective magnetic flux of the permanent magnet can be changed in conformity to the direction of the torque by the arrangement explained above. This will be described below:

In the generator where armature a winding is used for the stator, and a permanent magnet is employed for the rotor in principle, the direction of torque will be reversed if the rotor drive direction is reversed. Similarly, when working with the same motor, the direction of torque will also be reversed if the rotor drive direction is reversed.

If rotor drive directions are the same when functioning as a motor and when functioning as a generator, the directions of the torque received by the rotor when functioning as a motor and when functioning as a generator are opposite to each other.

The following describes how the basic theory on the direction of the drive and direction of the torque described above is applied to the generator as an embodiment according to the present invention.

To show one of the embodiments of the generator according to the present invention providing highly efficient power generation over an extensive range of wind power, the rotor split into two pieces is preferred to be operated under the following conditions: In the low speed range where wind force is weak, the same magnetic pole centers of the first rotor 20A and second rotor 20B are aligned, as shown in FIG. 4, so that the amount of effective magnetic flux due to the permanent magnet opposite to the stator magnetic pole will be increased, thereby getting high power characteristics.

Figure 5:
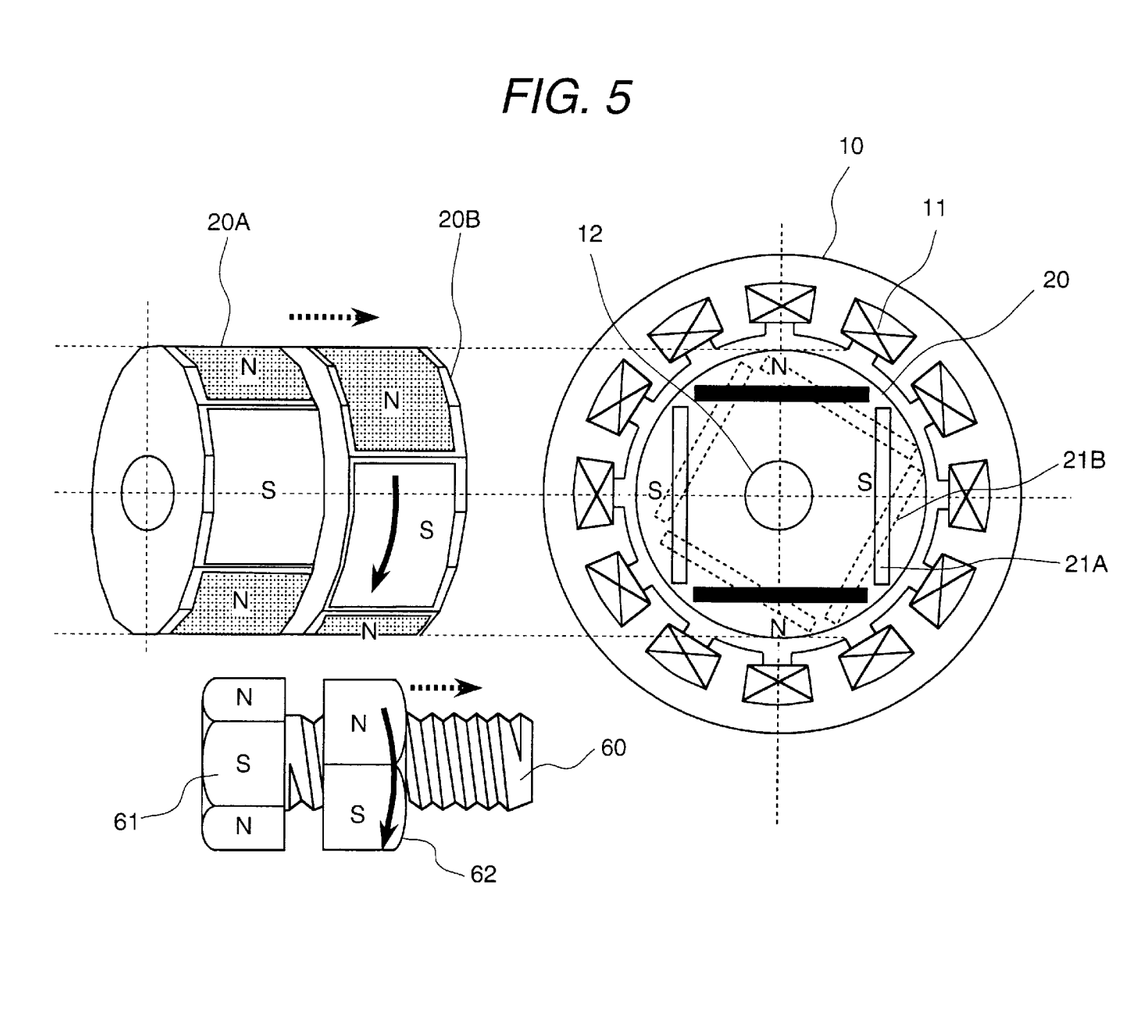
FIG. 5 is a schematic diagram wherein the same magnetic pole centers of the rotors of the generator FIG. 1 are displaced (2)

In the high-speed range with strong wind, the second rotor 20B rotates on the shaft 22 so that the nut is removed from the threaded portion of the bolt, as shown in FIG. 5, and the same magnetic pole centers are displaced while the space between the first rotor 20A and second rotor 20B is widening. This reduces the amount of effective magnetic flux due to the permanent magnet located opposite to the magnetic pole. In other words, field weakening effect is obtained and constant output characteristics are ensured in high speed range.

FIG. 5 is schematic diagram representing the case where the same magnetic pole centers are displaced as the space between the first rotor 20A and second rotor 20B is widening, and the amount of effective magnetic flux due to the permanent magnet located opposite to the magnetic pole is reduced.

Figure 4:
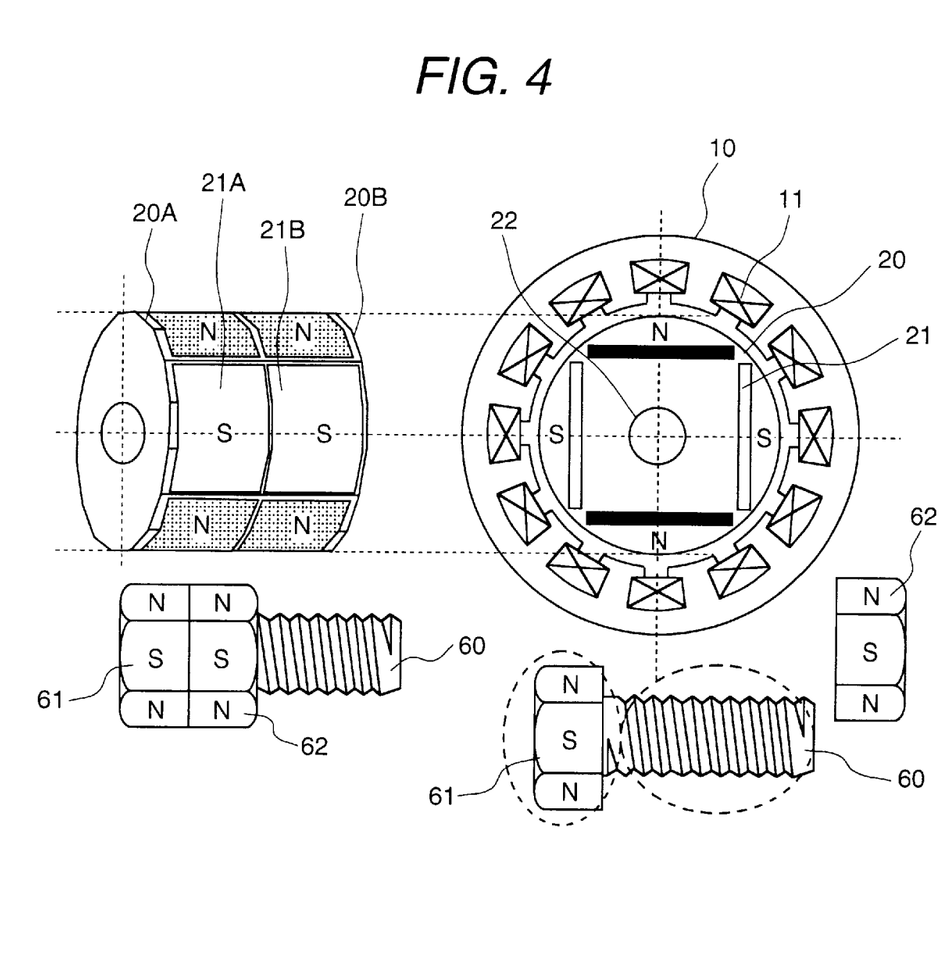
FIG. 4 is a schematic diagram wherein the same magnetic pole centers of the rotors of the generator FIG. 1 are aligned.

FIGS. 4 and 5 shows a bolt head 61, bolt thread 60 and nut 62. The bolt head 61 corresponds to the first rotor 20A, while nut 62 corresponds to the second rotor 20B. If bolt thread 61 (corresponding to 23A in FIG. 3) rotates in the same direction, the nut 62 is tightened or loosened, depending on the direction of the torque applied to nut 62. The second rotor 20B behaves in the same way depending on the direction of the rotor torque.

The directions of torque are opposite in forward and reverse rotations. If FIG. 4 shows the case of forward rotation, FIG. 5 shows the cases of reverse rotation.

Needless to say, the inner diameter of the second rotor 20B is threaded to serve as a nut 23B, and the shaft in contact therewith is threaded to served as a bolt thread 23A. They are connected with each other through their bolt/nut function. If the direction of the thread is reversed (for example, right-hand thread to left-hand thread), the positions of FIG. 4 and FIG. 5 are reversed, but the same effect can be obtained.

In the low-speed range of forward rotation as shown in FIG. 4 when the wind it weak, the amount of effective magnetic flux due to the permanent magnet located opposite to the stator magnetic pole is increased, if a thread combination is formed to ensure that the same magnetic pole centers of the first rotor 20A and second rotor 20B are aligned. This will provide high power characteristics.

If the reverse rotation is obtained by the pitch control of the aforementioned vane 70 in the case of strong wind, the following occurs even when high-speed drive range is reached: As shown in FIG. 5, the second rotor 20B rotates on the shaft 22 so that the nut is removed from the threaded portion of the bolt, and the same magnetic pole centers are displaced while the space between the first rotor 20A and second rotor 20B is increased. The amount of effective magnetic flux due to the permanent magnet opposite to the stator magnetic pole is reduced. In other words, field weakening effect is obtained and high power characteristics are ensured in high speed range.

Figure 6A:
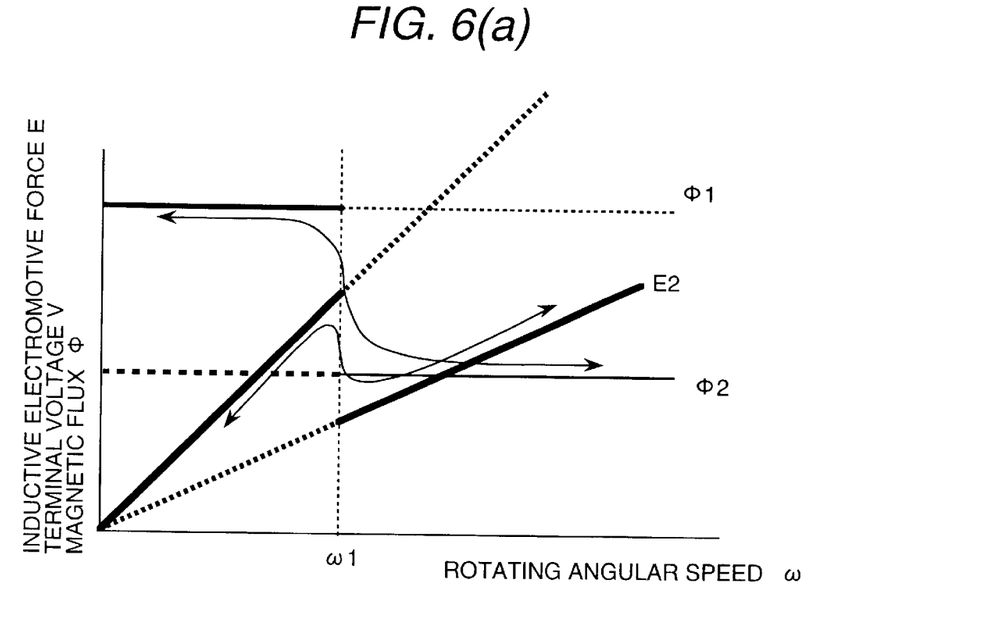
FIGS. 6a and 6b indicates various characteristics with respect to the rotating angular speed of the generator in FIG. 1.
Figure 6B:
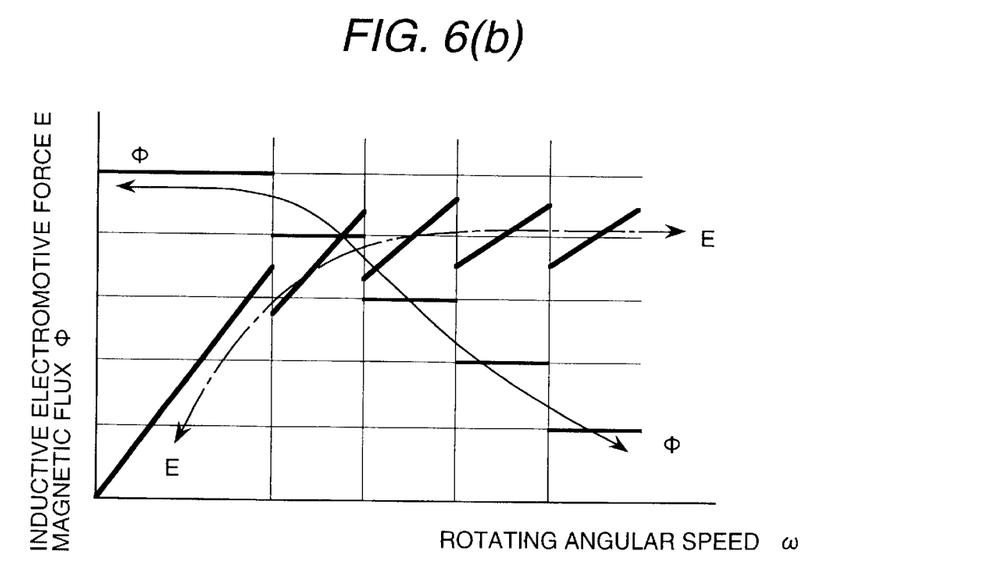

The following describes the actions of the inductive electromotive force by the generator according to the present invention:

FIG. 6 is a diagram representing the characteristics of effective magnetic flux, Inductive electromotive force and terminal voltage of the permanent magnet type synchronous generator with respect to rotating angular speedy.

The inductive electromotive force E of the permanent magnet type synchronous generator is determined by a constant magnetic flux $\Phi$ issued from the permanent magnet mounted on the rotor and the rotating angular speed $\omega$ of the generator. In other words, if magnetic flux $\Phi 1$ issued from the permanent magnet mounted on the rotor $\Phi$ is constant as shown in FIG. 6(a), the inductive electromotive force El of the generator rises in proportion to the rise of rotating angular speed $\omega$ (speed). However, the output voltage of the inverter is restricted by the terminal voltage of the power supply system and inverter capacity, and there is a restriction to the inductive electromotive force issued by the generator in the state of steady operation. Therefore, in the permanent magnet type synchronous generator, so-called field weakening control must be provided to reduce the magnetic flux produced by the permanent magnet in the range over a certain speed.

Since the inductive electromotive force rises is proportional to rotating angular speed, field weakening control current must also be increased. This makes it necessary to feed a large current to the coil as a primary conductor with the result that there is an increase in the heat generated by the coil. This may cause reduction of efficiency as a generator in the high speed drive range and demagnetization of the permanent magnet due to heat generation in excess of the cooling capacity.

For example, if a constant magnetic flux $\Phi 1$ issued from the permanent magnet mounted on the rotor changes to the magnetic flux $\Phi 2$ at a certain rotating angular speed $\omega 1$ (drive speed) as shown in FIG. 6(a), the inductive electromotive force E1 of the generator changes to characteristics of the inductive electromotive force E2. The maximum value of the inductive electromotive force can be restricted by this procedure.

FIG. 6(b) shows that the inductive electromotive force E can be maintained constant if the magnetic flux $\Phi$ changes in finer steps in conformity to rotating angular speed $\omega$ (drive speed) in the similar manner.

One of the means for obtaining the characteristics shown in FIG. 6 is embodied by use of a generator characterized as follows: The aforementioned first field magnet is fixed on the shaft, and the aforementioned second field magnet is separated from the shaft. The shaft and second field magnet are connected with each other by this thread function wherein the shaft is threaded to serve as a bolt and the second field magnet is internally threaded to serve as a nut. A stopper is provided away from the side of the second field magnet, and a servo mechanism is used to allow the stopper to be moved in parallel with the shaft according to the drive speed.

FIG. 6 is a drawing representing the configuration of the control circuit of the main shaft generator.

FIG. 6 is a control block diagram representing the generator 2 given in FIG. 1.

Based on the information set on the control panel (numeral 84 or 75 in FIG. 1), information from the aforementioned anemometer/anemoscope 71 and the speed of the permanent magnet type synchronous generator 2, an operation decision unit 101 evaluates the operation of the permanent magnet type synchronous generator 2 and outputs the current command. The current command output from the operation decision unit 101 is input into the current control block 102 which provides non-interference control with respect to the difference from the current value for the present permanent magnet type synchronous generator 2.

The output from the current control block 102 is converted into the 3-phase alternating current by the rotary coordinate converter 103, and controls the permanent magnet type synchronous generator 2 through an inverter 104. The current of each phase (at least current of two phases) and speed of the permanent magnet type synchronous generator 2 are detected, and the current of each phase is converted into two-shaft current, which is fed back to the current command value. The drive speed, magnetic pole position and other related information are detected by the detector 106, and are fed back to each control block through the magnetic pole position converter unit 107 and speed converter unit 108.

Figure 7:
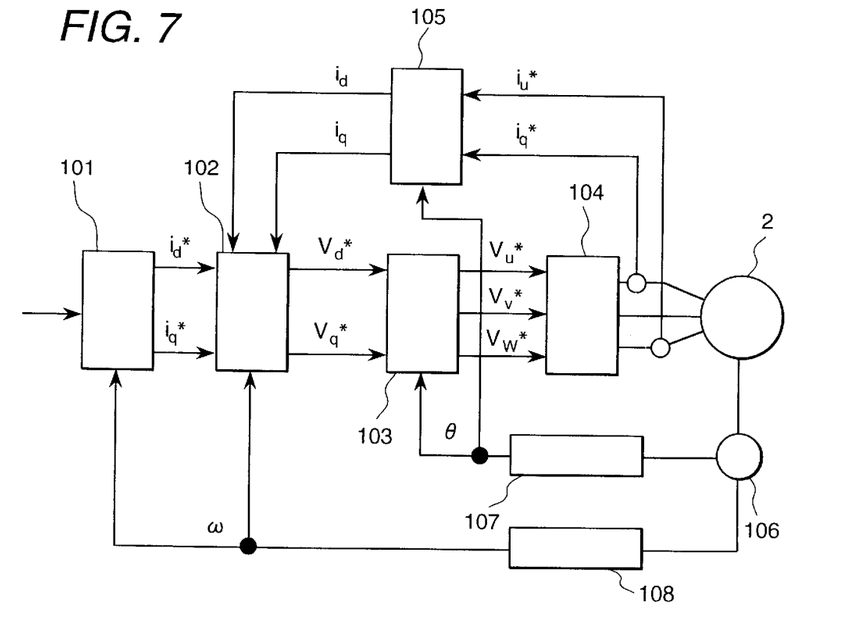
FIG. 7 is a control block diagram for the generator in FIG. 1.

FIG. 7 shows the embodiment where the position/speed sensor and current sensor of the generator 2 are provided. The embodiment can be achieved by control configuration of a generator 2 where no sensor is used.

The permanent magnet type synchronous generator as an embodiment according to the present invention allows the magnetic pole centers of the first and second rotors to be aligned or displaced according to the operation conditions in conformity to displacement of the composite magnetic pole position of the aforementioned first and second field magnets. It has a function of correcting the lead angle of the current by a controller for controlling the aforementioned inverter.

The following describes an embodiment of correcting the lead angle of the current:

The aforementioned first field magnet is fixed on the shaft, and the aforementioned second field magnet is separated from the shaft. At the same time, the shaft and second field magnet are connected with each other by this thread function wherein the shaft is threaded to serve as a bolt and the second field magnet is internally threaded to serve as a nut. If operation is performed under this condition, the second field magnet moves to the right and left in the axial direction while rotating.

Figure 15:
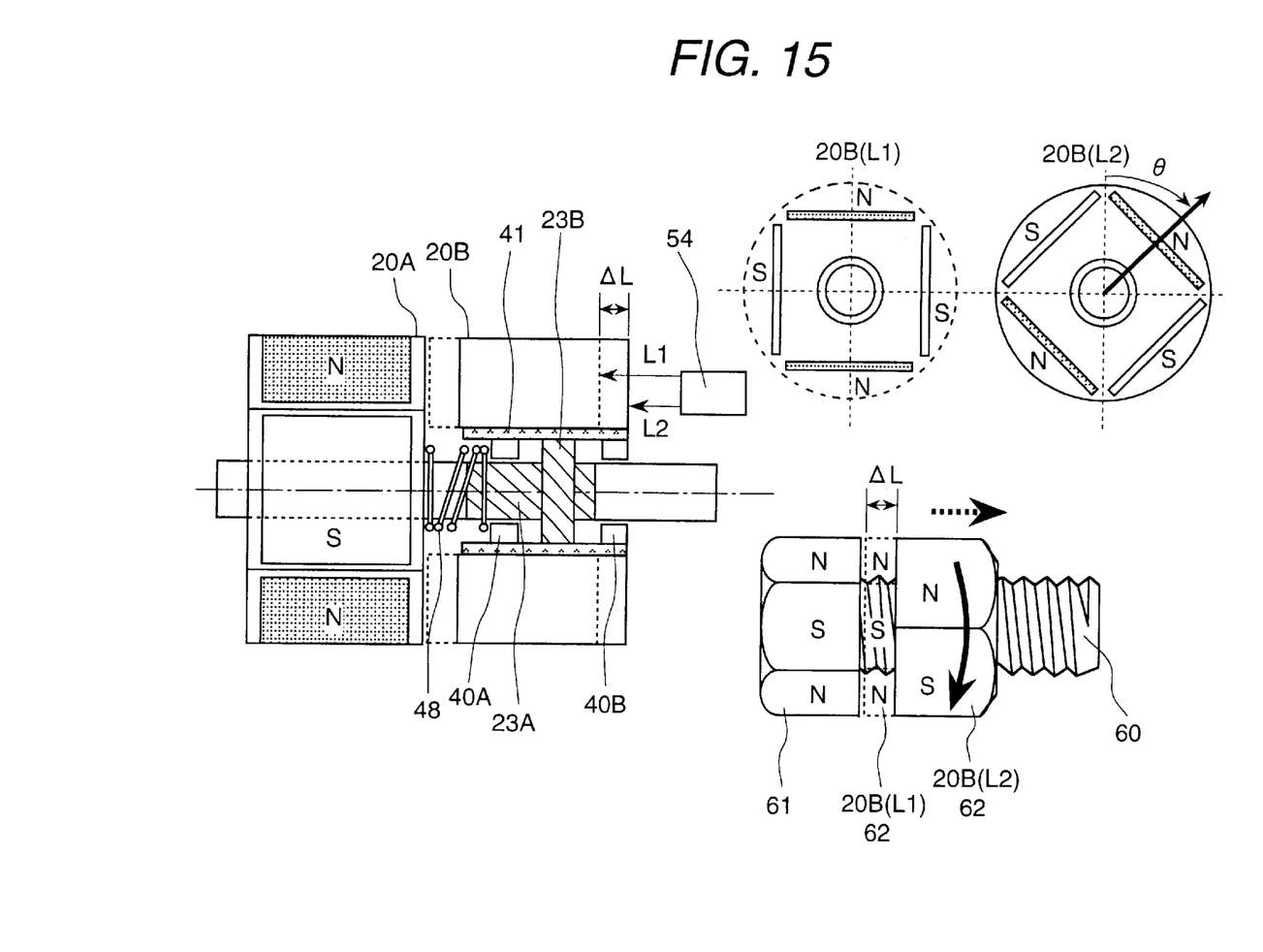
FIG. 15 is a schematic diagram representing the measurement of an axial displacement of a generator as a further embodiment of the present invention.

FIG. 15 shows the relationship between rotating angle and axial displacement when the magnetic pole centers of the first and second rotors are aligned or displaced according to the operation conditions.

In FIG. 15, the rotating angle θ of the second rotor is proportional to the axial displacement ΔL. A displacement measurement 64 is used to measure the axial displacement ΔL, and the result is fed back to the position detecting circuit (106 in FIG. 7) of the control circuit, where it is converted into the composite displacement angle of magnetic pole position of the first and second field magnets. The converted value is used in the optimum control for correction of the lead angle of the current. In FIG. 15, a displacement measurement means 64 is used measure the axial displacements L1 and L2 of the second rotor 20B with respect to the first rotor 20A, and the detected displacements L1 and L2 is fed back to a controller for controlling the permanent magnet type synchronous motor. In other words, when the second rotor 20B is displaced by the rotating angle θ with respect to the first rotor 20A, the lead angle of the current supplied to the permanent magnet type synchronous motor must be corrected, accordingly. Furthermore, the rotating angle θ of the second rotor 20B and displacement ΔL in the axial direction are proportional to each other.

In the present embodiment, the axial displacements L1 and L2 of the second rotor 20B with respect to the first rotor 20A are fed back to the controller to obtain a difference of displacement ΔL. The lead angle of the current supplied from the power converter to the permanent magnet type synchronous motor is corrected based on this difference ΔL. The optimum control of the permanent magnet type synchronous motor is ensured by correction of the lead angle of current, according to the present embodiment.

Figure 8:
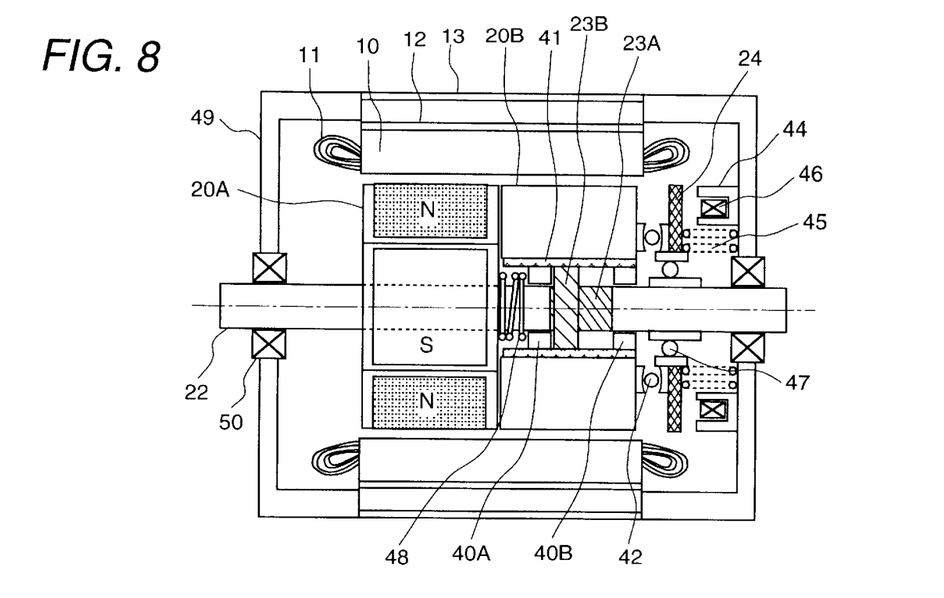
FIG. 8 shows a generator as another embodiment of the present invention (when the actuator is off)

FIG. 8 shows an generator as another embodiment of the present invention.

The aforementioned rotor 20A magnet is fixed on the shaft 22, and the aforementioned rotor 20B is separated from the shaft. At the same time, part of the shaft is provided with a threaded portion 23A, and a sleeve 41 is fixed inside the second field magnet, with nut 23B fixed inside the sleeve 41. They are made into an integral unit, then the second rotor 20B rotates on the shaft 22 so that the nut is removed from the threaded portion of the bolt while the space between the first rotor 20A and the second rotor 20B is widening.

There is a slight play between the inside of the second field magnet and the shaft 22. So if a change of flux linkage occurs between the inside of the second field magnet and the shaft 22, failure such as electrolytic corrosion occurs. However, when the non-magnetic substance having a higher electric resistivity than iron is used for the aforementioned sleeve 41, the effect of insulation can be obtained between the inside of the second field magnet and the shaft 22 both magnetically and electrically.

Supporting mechanisms 40A and 40B is provided inside the sleeve 41 to guide the rotary, reciprocal and composite movements between the aforementioned second field magnet and shaft.

The second rotor 20B is connected with the shaft partly provided with the threaded portion 23A through thread functions, and a stopper 24 that can be changed is installed away from the side of the second field magnet. Supporting mechanisms 42 and 47 for guiding the rotary, reciprocal and composite movements are installed between the stopper 24 and shaft, and between the stopper and the side of the second rotor 20B. The supporting mechanism 42 serves as a thrust bearing, and the supporting mechanism 47 as a radial bearing serves to guide the rotary, reciprocal and composite movements.

Further, installation of the spring 48 improves the function of the supporting mechanism 42 as a thrust bearing.

The following describes an electromagnetic clutch as an example of the servo mechanism which allows the stopper 24 to move in parallel with the shaft.

The electromagnetic clutch is arranged in such a way that a coil 46 is wound on the yoke 44, and the stopper 24 also serves as a function of the movable iron. The yoke 44 and coil 46 are fixed to either the frame 49 of the generator or part of the housing (not illustrated). A spring 45 is mounted between the yoke 44 and stopper 24 to provide a function of resetting when excitation is interrupted. A bearing 51 is installed between the frame 49 of the generator and shaft 22 to provide support.

Figure 9:
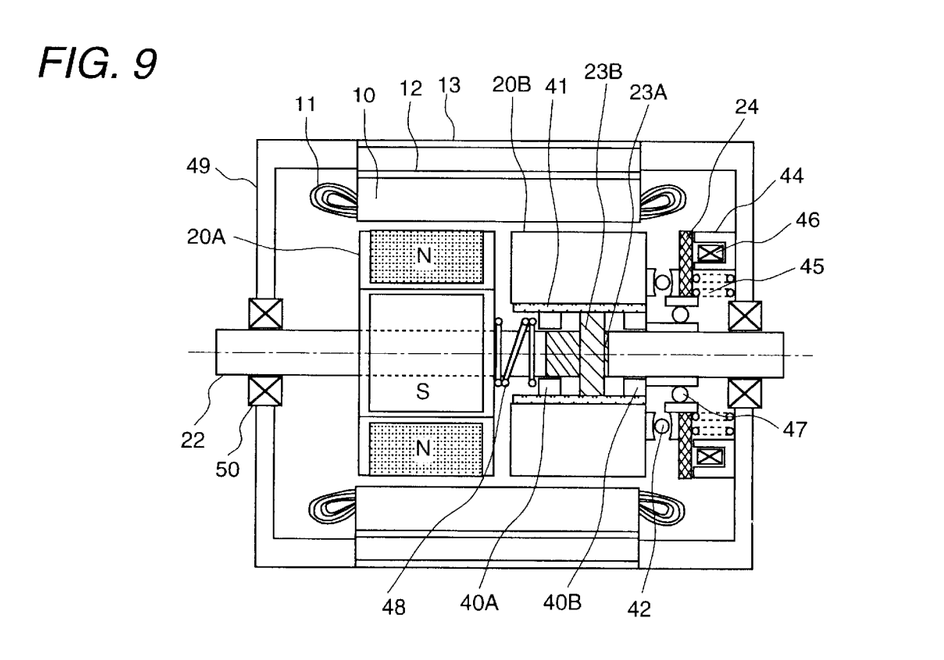
FIG. 9 shows a generator as a further embodiment of the present invention (when the actuator is on)

FIG. 8 shows the coil 46 when not excited, while FIG. 9 shows it in the excited state.

When the coil 46 is excited, the yoke 44 turns into a powerful electromagnet, and attracts the stopper 24 which also has a function of a movable core.

When the coil 46 is excited to attract the stopper 24, it is possible to save the current flowing to the coil 46 if torque is applied to ensure that the second rotor 20B rotates on the shaft 22 while the space between the first rotor 20A and second rotor 20B is widening so that the nut is removed from the threaded portion of the bolt.

The electromagnetic clutch shown here is an example of the servo mechanism which allows the stopper 24 to move in parallel with the shaft. Still finer positioning of the stopper can be ensured by using a linear drive unit including a hydraulic actuator, rotor and ball screw, and linear motor.

Figure 10:
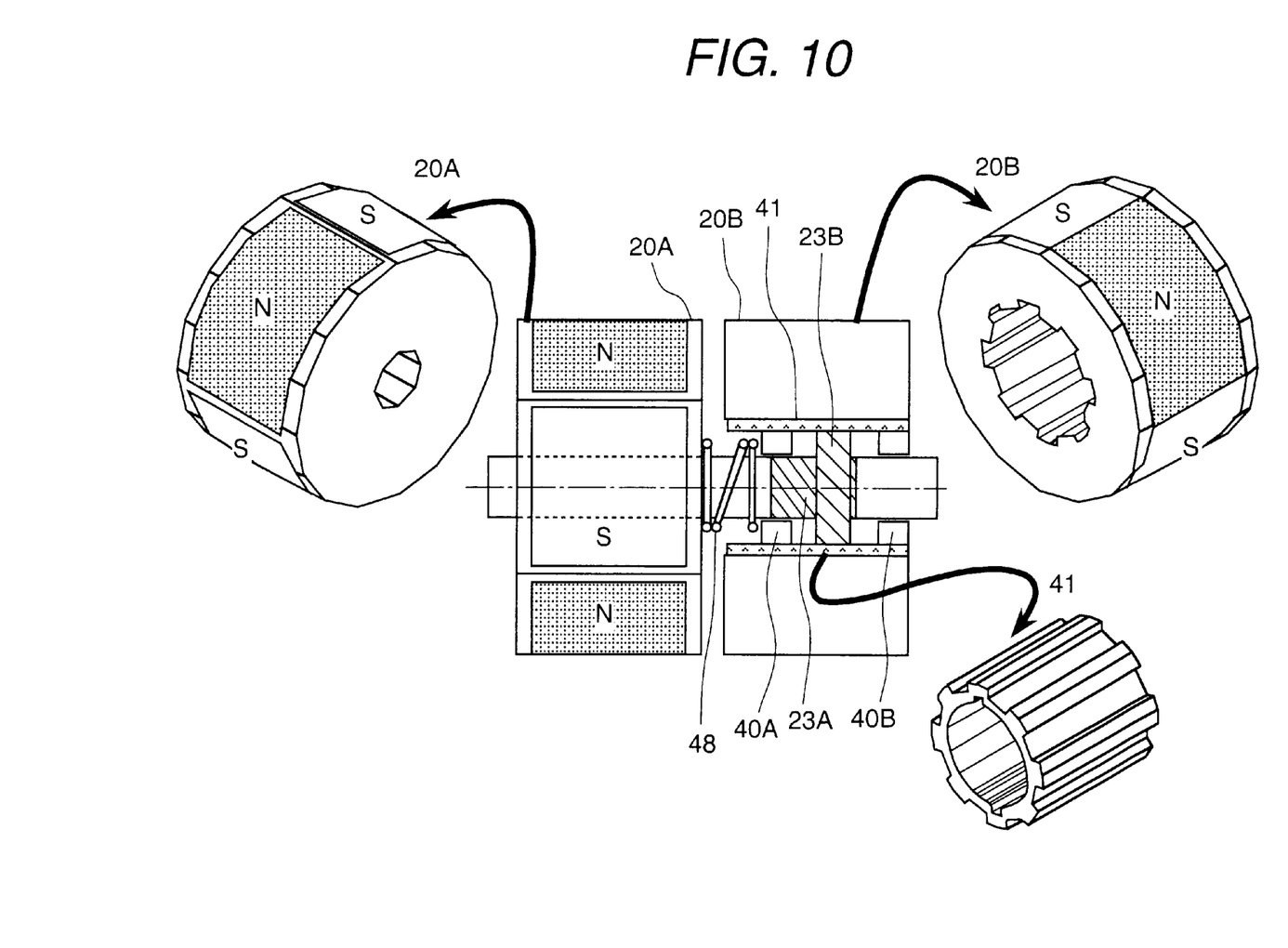
FIG. 10 shows the inside of a rotor of the generator as a still further embodiment of the present invention.

FIG. 10 shows an example of the sleeve 41 fixed inside the second rotor 20B.

As one of the methods for fixing them, a recess and projection are provided on the contacting surfaces of two parts comprising the second rotor 20B and sleeve 41. Further, a general view is given to represent the internal differences between the first rotor 20A fixed to the shaft 22 and the second rotor 20B separated from therefrom.

Figure 11:
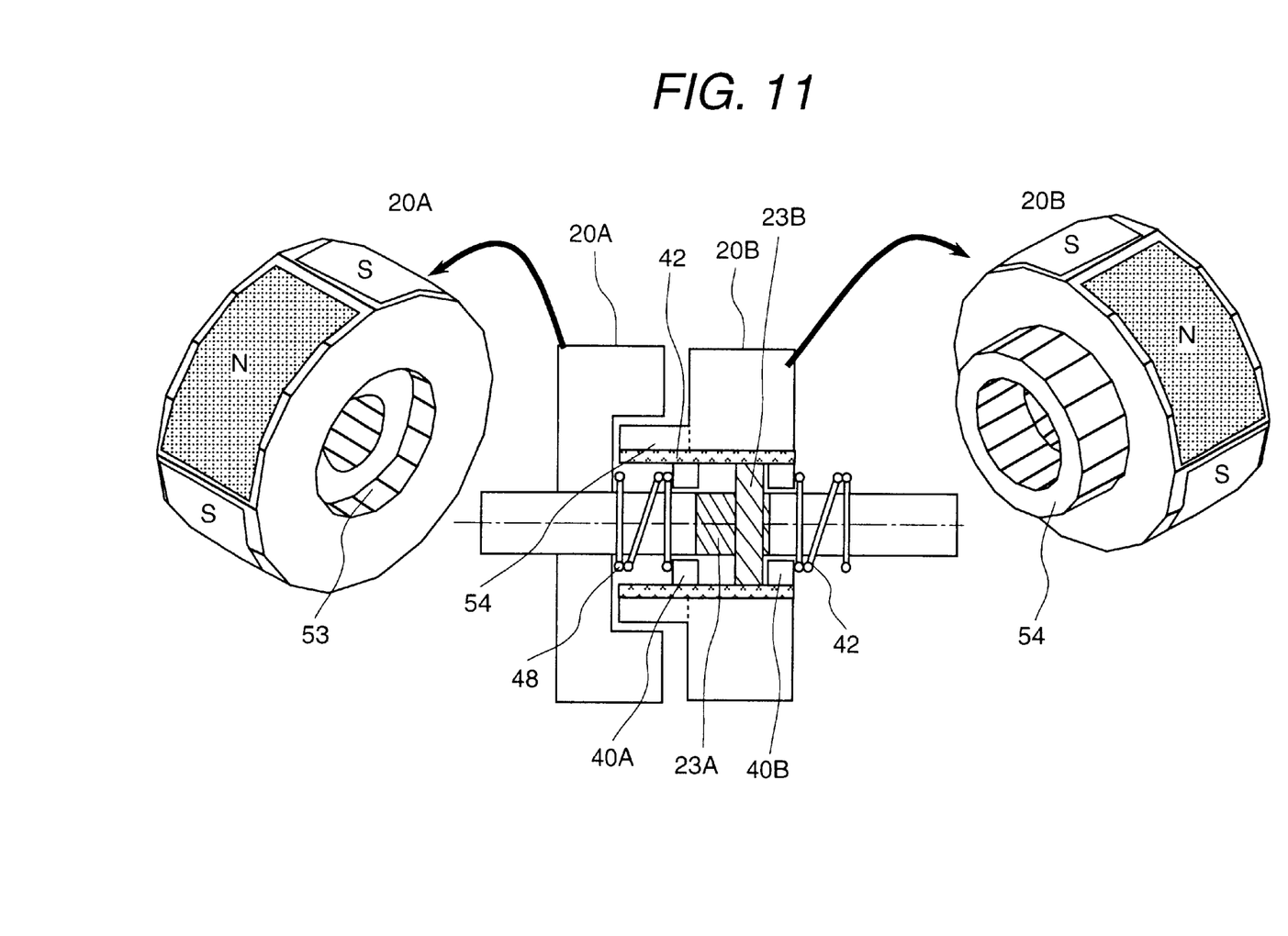
FIG. 11 shows the inside of a rotor of the generator as a still further embodiment of the present invention.

FIG. 11 shows still another embodiment of the present invention.

A recess 53 is provided on the side of the aforementioned where the first field magnet with which the aforementioned first and second field magnets are in contact, and a projection 54 also serving as the aforementioned sleeve is provided on the aforementioned second field magnet. The projection 54 can be integral with the sleeve 41 or with the second rotor 20B. Therefore, this is an effective method for the generator equipped with second rotor 20B characterized by a long shaft and small thickness when a sufficient space for the sleeve 41 is ensured and spring 48, supporting mechanisms 41A and 41B, and nut 23B are effectively arranged.

Figure 12:
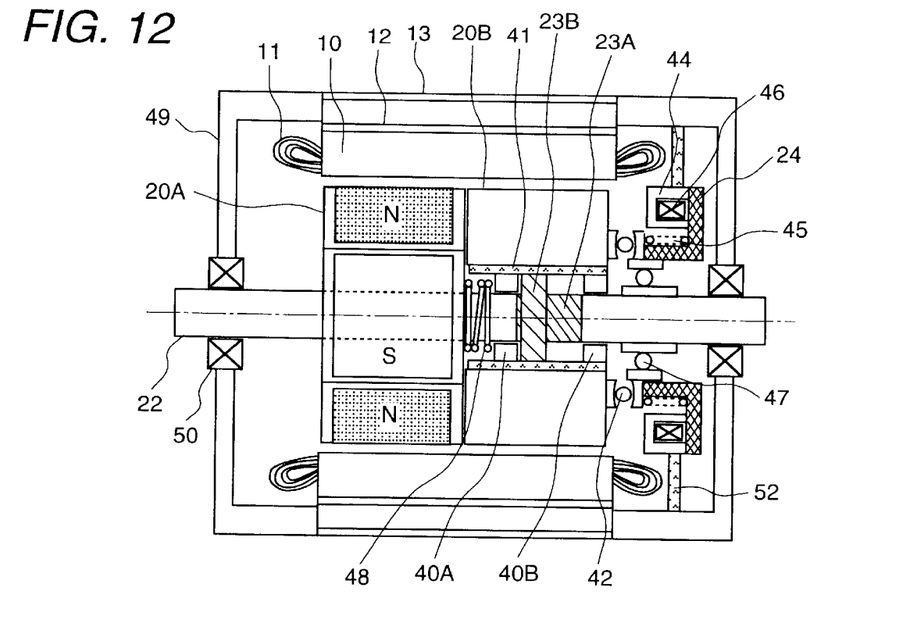
FIG. 12 shows a generator as a further embodiment of the present invention (when the actuator is on)

FIG. 12 shows a still further embodiment of the present invention.

Basic configuration elements given in FIG. 12 are the same as those in FIG. 8, but the portion corresponding to the electromagnetic clutch is partially modified. FIG. 12 shows the coil 46 in an excited state. When not excited, the yoke 44 and stopper 24 are separated by the spring 45. Another characteristic is that thrust is provided by the thread function due to the interaction between the threaded portion 23A of the bolt where torque is applied to the second rotor 20B and nut 23B. Therefore, when thrust for pushing out the stopper 24 is added by the thread function, the stopper 24 and yoke 44 are separated from each other when the coil 46 is deenergized. The yoke is fixed to the frame 49 or part of the housing (not illustrated) through the arm 52.

The electromagnetic clutch shown in FIG. 12 is an example of the servo mechanism which allows the stopper 24 to move in parallel with the shaft, as in the case of FIGS. 8 and 9. Still finer positioning of the stopper can be ensured by using a linear drive unit including a hydraulic actuator, rotor and ball screw, and linear motor.

Needless to say, constituent elements shown in the figure can be used in various combinations, and they can be machined or removed according to the application requirements.

Figure 13:
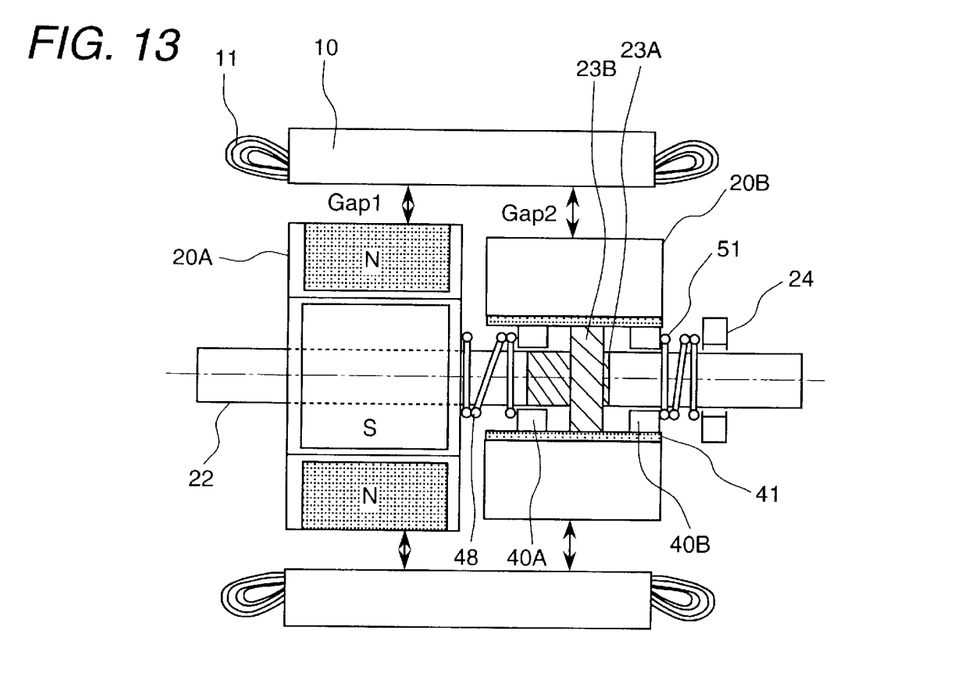
FIG. 13 is a schematic diagram representing the rotor of a generator as a further embodiment of the present invention (when with difference in gap)

FIG. 13 a still further embodiment of the present invention.

The generator of the present invention is further characterized in that, while the first rotor 20A is firmly fixed to the shaft 22, the second rotor 20B is movable with respect to the shaft 22. Thus,there is a slight mechanical play between the second rotor 20B and shaft 22, so center displacement may occur if a big torque or centrifugal force is applied. Therefore, air gap GAP2 between the second rotor 20B with the second field magnet and aforementioned stator is made greater than the air gap GAP1 between the first rotor 20A with the first field magnet and aforementioned stator. This has an effect to eliminating the need of mechanical connection between the second rotor 20B and aforementioned stator by center displacement.

If multiple springs 48 and springs 51 are installed between the stopper 24 and the second rotor 20B, and between the first rotor 20A and the second rotor 21B, an abrupt change of the second rotor 20B can be suppressed or the movement in the direction of torque can be assisted.

Figure 14:
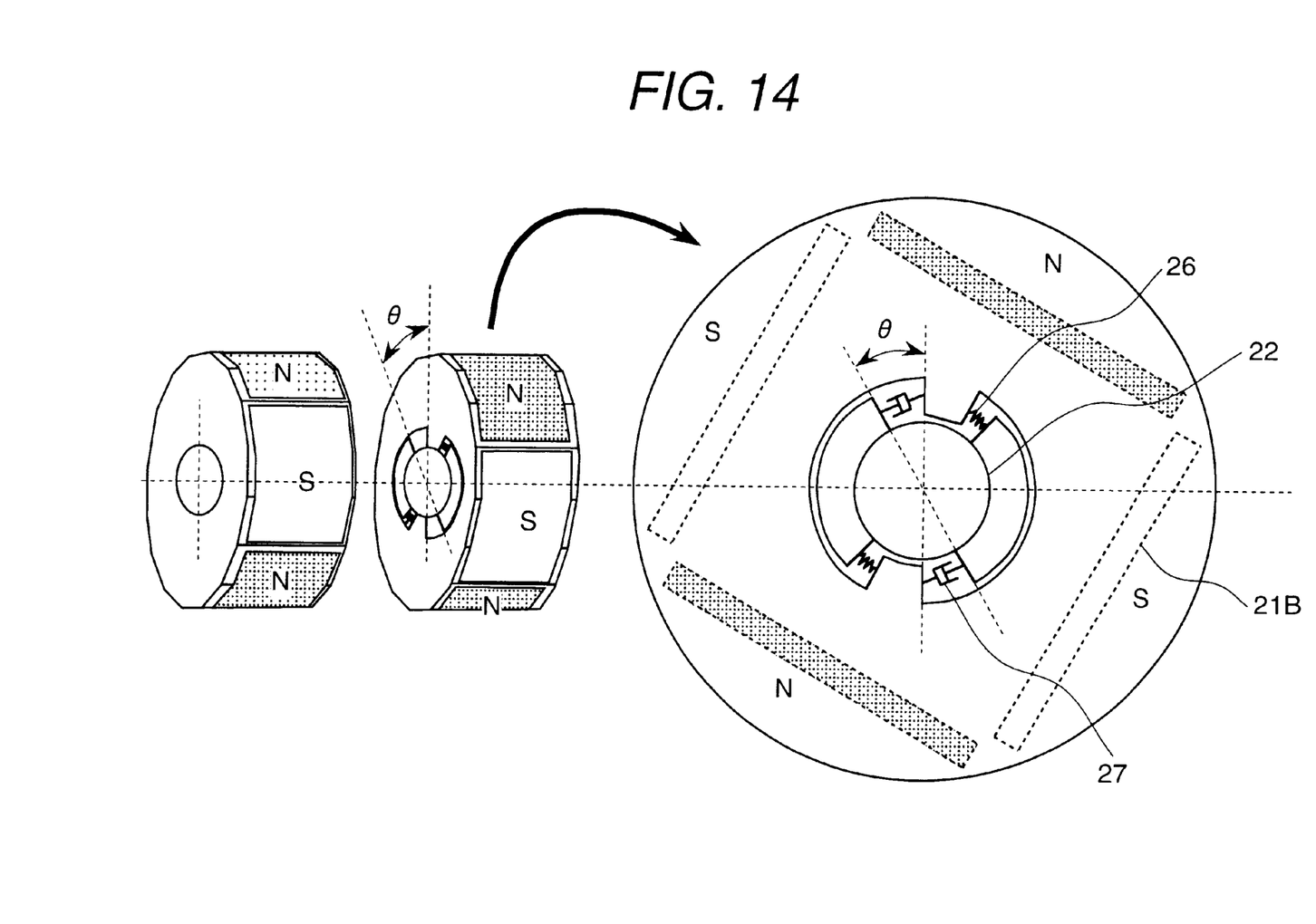
FIG. 14 is a schematic diagram representing the rotor of a generator as a further embodiment of the present invention.

FIG. 14 shows a generator as another embodiment of the present invention.

It represents a permanent magnet type synchronous generator provided with a mechanism allowing changes by rotating angle θ, without a threaded portion 23 of the second rotor shown in the FIG. 2.

The shaft 22 is provided with gear tooth-like recesses and projections, instead of the threaded portion of the second rotor shown in FIG. 2, and the inner diameter side of the second rotor 20B is provided with projections and recesses so that the shaft can be inserted therein. However, when the shaft 22 is inserted into a space on the inner diameter side of the second rotor 20B, the groove is wider than the meshing teeth to permit a change by a specified rotating angle θ. Further, spring 26 and damper 27 are installed between the meshing teeth and groove, thereby alleviating abrupt collision.

Figure 16:
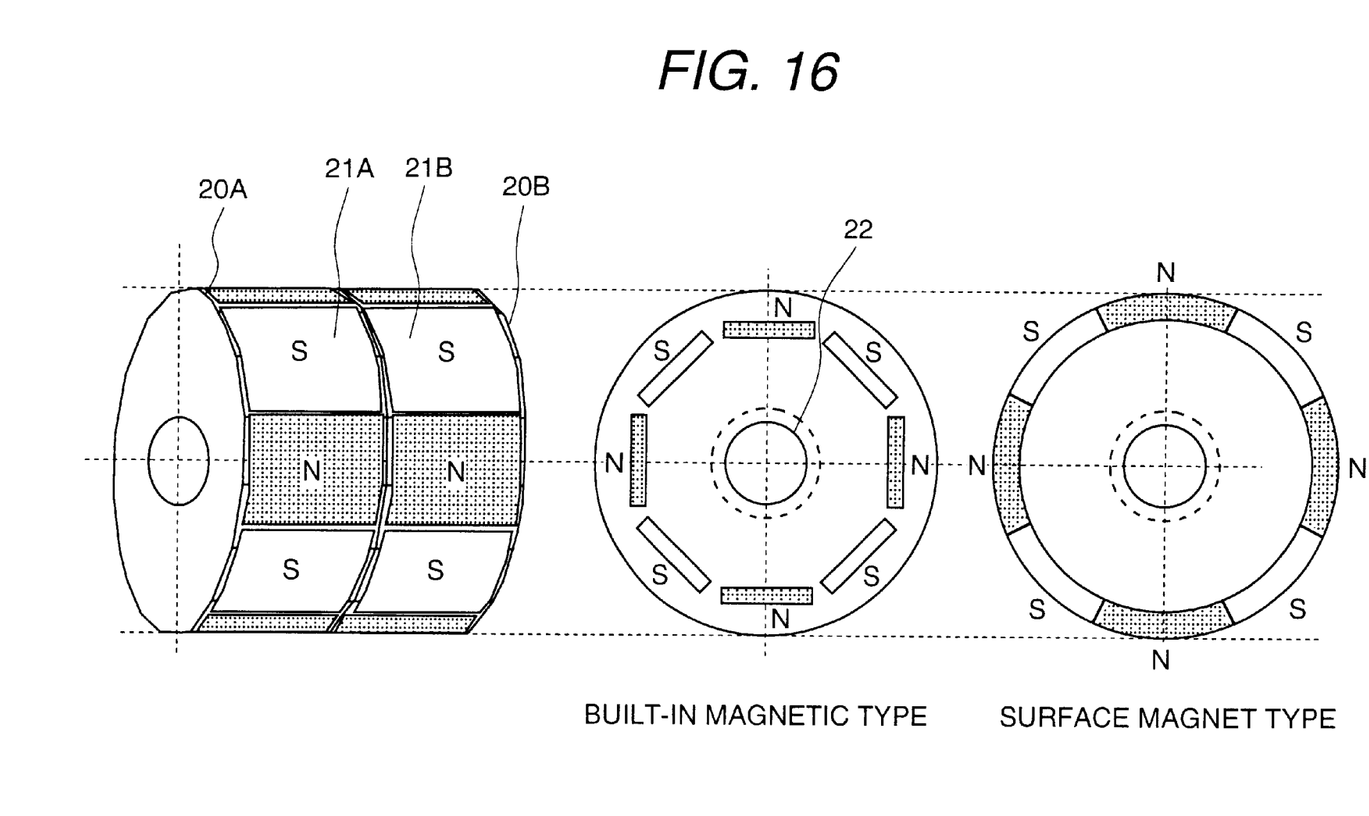
FIG. 16 is a schematic diagram representing the rotor of a generator as a further embodiment of the present invention (when applied to a 8-pole machine).

The above description of the present invention has been made with regard to a 4-pole machine. Needless to say, the description is also applicable to a 6-pole machine, 8-pole machine or other multi-polar machines. As an example, FIG. 16 shows an outline of the rotor of a permanent magnet type synchronous generator when the present invention is applied to a 8-pole machine. It goes without saying that an embedded type magnet or surface magnet can be used as a rotor.

What is claimed is:

1. A wind power generation system comprising;
    a main shaft where a vane is mounted,
    a generator connected to the main shaft for transmitting the rotating power of said vane,
    an inverter for converting the electric power of said generator,
    a controller for controlling said inverter,
    a means for controlling the pitch of the vane meeting the wind velocity requirements,
    a brake, and
    an anemometer/anemoscope;
    said wind power generation system using said generator further characterized in that,
        said generator further comprises a stator having a primary winding and a rotor having a field magnet, the field magnet further comprises;
            a first field magnet having magnetic poles with different polarities arranged sequentially in the direction of rotation, and
            a secondary field magnet having magnetic poles with different polarities arranged sequentially in the direction of rotation,
            this second magnet being capable of relative rotation with respect to the first field magnet;
            said first and second field magnets are placed opposite to said stator magnetic pole;
            a mechanism for changing the composite phase of the magnetic poles of said first and second field magnets with respect to magnetic pole of the first field magnet in conformity to the direction of the rotor torque; and
            said mechanism of changing in conformity to the direction of the rotor torque has;
                a means for aligning the same magnetic pole centers of said first and second field magnets in conformity to the direction of torque occurring to the rotor and the balance of magnetic action between the first and second field magnets, and
                a means for displacing the magnetic pole centers of said first and second field magnets as the direction of torque occurring to the rotor is reversed.

2. A wind power generation system according to claim 1 characterized in that said generator comprises;
   a means for arranging said first and second field magnets in the initial position, and
   a means for displacing the magnetic pole centers of said first and second field magnets;
   said wind power generation system using said generator further characterized in that,
      the mechanism for changing the magnetic pole center in conformity to changes in the direction of the torque is arranged in such a way that the
      said first field magnet is fixed to the shaft;
      said second field magnet is separated from the shaft;
      the shaft and the second field magnet can be displaced within the angle corresponding to one magnetic pole; and
      the magnetic pole centers of said first and second field magnets can be displaced.

3. A wind power generation system according to claim 1 using a generator further characterized in that the mechanism for changing the magnetic pole center in conformity to changes in the direction of the torque is arranged in such a way that said first field magnet is fixed to the shaft;
   said second field magnet is separated from the shaft;
   said shaft and second field magnet are connected with each other by this thread function wherein the shaft is threaded to serve as a bolt and the second field magnet is internally threaded to serve as a nut;
   a stopper is provided away from the side of the second field magnet; and
   said generator comprises a servo mechanism which allows the stopper to be changed in parallel with the shaft according to the drive speed.

4. A generator according to claim 1, further characterized in that the current supply lead angle is adjusted by a controller for controlling said inverter in conformity to the deviation of composite magnetic pole positions of said first and second field magnets.

5. A generator according to claim 1, further characterized in that said first field magnet is fixed to the shaft; said second field magnet is separated from the shaft; said shaft and second field magnet are connected with each other by this thread function wherein the shaft is threaded to serve as a bolt and the second field magnet is internally threaded to serve as a nut; the amount of change of said second field magnet in the axial direction is detected; and the current supply lead angle is adjusted by a controller for controlling said inverter in conformity to the deviation of composite magnetic pole positions of said first and second field magnets.

6. A generator according to claim 1, further characterized in that said first field magnet is fixed to the shaft; said second field magnet is separated from the shaft; and multiple support mechanisms capable of guiding rotary, reciprocal and composite movements are installed between said first and second field magnets.

7. A generator according to claim 1, further characterized in that said first field magnet is fixed to the shaft; said second field magnet is separated from the shaft; and multiple springs are located on the front and back of said second field magnet to guide rotary, reciprocal and composite movements of said second field magnet.

8. A generator according to claim 1, further characterized in that said first field magnet is fixed to the shaft; said second field magnet is separated from the shaft; and a sleeve is located between the inside of said second field magnet and the shaft, where said second field magnet and said sleeve are fixed together.

9. A generator characterized in that the sleeve according to claim 8 is made of a non-magnetic substance having a higher electric resistivity than iron.

10. A generator according to claim 1, further characterized in that said first field magnet is fixed to the shaft; said second field magnet is separated from the shaft; a recess is provided on the side of said first field magnet where said first and second field magnets are in contact; and a projection serving as a sleeve is provided on the side of said second field magnet.

11. A generator according to claim 1, further characterized in that said first field magnet is fixed to the shaft; said second field magnet is separated from the shaft; a stopper is provided away from the side of the second field magnet; and said stopper has a support mechanism capable of guiding rotary, reciprocal and composite movements for said second field magnet and shaft.

12. A generator according to claim 1, further characterized in that said first field magnet is fixed to the shaft; said second field magnet is separated from the shaft; and the air gap between the rotor having the second field magnet and said stator is greater than the air gap between the rotor having the first field magnet and said stator.

13. A wind power generation system according to claim 1, using a generator further characterized in that the magnetic pole centers of said first and second field magnets are aligned during low speed drive of said generator, while the magnetic pole centers of said first and second field magnets are displaced during high speed drive of said generator.

14. A wind power generation system according to claim 1 using said generator characterized in that the magnetic pole centers of said first and second field magnets are aligned during the rotation of said generator in one direction while the magnetic pole centers of said first and second field magnets are displaced during the rotation in the other direction.

\* \* \* \* \*